United States Patent [19]

Knowles

[11] E Patent Number: Re. 31,807

[45] Reissued Date of Patent: Jan. 22, 1985

[54] TRUSS-WEB CONNECTOR

[76] Inventor: James Knowles, 1275 Club Dr., Bloomfield Hills, Mich. 48013

[21] Appl. No.: 130,032

[22] Filed: Mar. 13, 1980 (Under 37 CFR 1.47)

Related U.S. Patent Documents

Reissue of:

[64] Patent No.: 4,078,352
Issued: Mar. 14, 1978
Appl. No.: 727,906
Filed: Sep. 30, 1976

U.S. Applications:

[63] Continuation-in-part of Ser. No. 576,031, May 9, 1975, Pat. No. 4,002,116.

[51] Int. Cl.[3] ..... E04C 3/02

[52] U.S. Cl. ..... 52/693; 52/696; 411/463

[58] Field of Search ..... 52/693, 696; 411/457–463

[56] References Cited

U.S. PATENT DOCUMENTS

| | | | |
|---|---|---|---|
| 1,645,060 | 10/1927 | Kraft | 52/634 |
| 1,704,235 | 3/1929 | Zabriskie | 52/693 |
| 3,025,577 | 3/1962 | Jureit | 52/693 |
| 3,416,283 | 12/1968 | Sanford | 52/693 |
| 4,002,116 | 1/1977 | Knowles | 100/100 |
| 4,078,352 | 3/1978 | Knowles | 52/693 |

*Primary Examiner*—James L. Ridgill, Jr.

[57] ABSTRACT

A V-shaped, substantially flat, sheet metal, combined web-connector plate having diverging web-forming legs and integral apex and leg end connector portions provided with struck-out teeth for embedding within spaced apart wooden chord members to form a wood chord-metal web type truss. The connector plate is offset inwardly from the end of the chord and the connector plate is positioned to slightly overlap a beam or columnar support to reduce shear stress in the chord.

22 Claims, 11 Drawing Figures

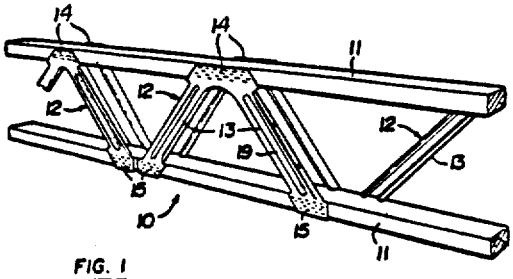
FIG. 1
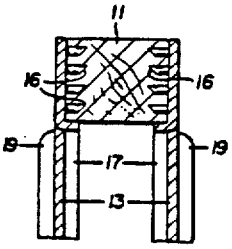
FIG. 2
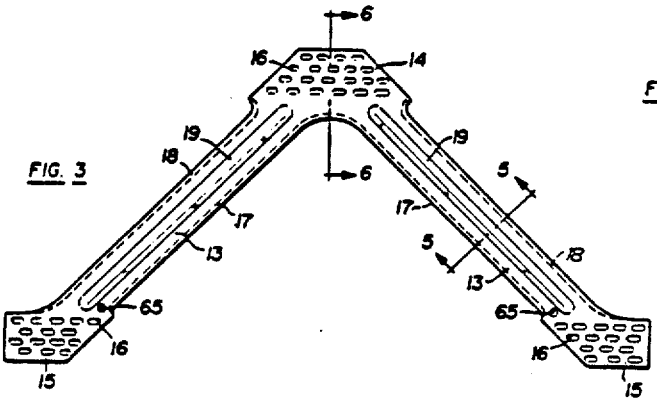
FIG. 3
FIG. 4
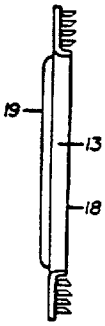
FIG. 5
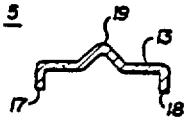
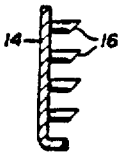
FIG. 6
FIG. 7
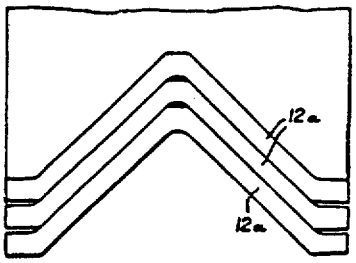

TRUSS-WEB CONNECTOR

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of my copending application Ser. No. 576,031, filed May 9, 1975, now U.S. Pat. No. 4,002,116, issued Jan. 11, 1977.

BACKGROUND OF INVENTION

One type of conventional floor truss which is used for supporting building floor surfaces, roof decks, and the like, is formed of a pair of parallel, wooden chords, such as 2×4 wood strips, arranged one above the other, and interconnected by diagonally arranged webs or struts made of sheet metal. The webs are fastened, at their opposite ends, to the respective chords by means of mailing or by overlapping them with so-called "connecting plates" which are flat plates having struck-out teeth which extend through holes in the web ends, for embedding within the wooden chords. Such types of trusses are normally manufactured in a factory building and transported to a construction site for installation as part of a building.

In the manufacture of such trusses, it is important to utilize as inexpensive a construction as possible, consistent with providing desired strengths. It is also important to utilize the truss in a manner which will reduce the shear stress in the chord.

Thus, the invention herein relates to an improved web device which requires minimum handling and which is of a construction that provides maximum strength to the truss, and also an improved structure including such a web device.

SUMMARY OF INVENTION

The invention herein relates first to an improved metal web which is of approximately V-shape or chevron-shaped, formed of flat sheet metal, to provide a pair of diverging legs forming webs, and an integral apex and web end connector plate portions each having struck-out teeth for embedding within the wooden chords. The combination web-connector construction is for applying against the sides only of a pair of vertically aligned chords and is so configured as to easily absorb, transmit and neutralize the various compressive and tensile forces applied to the completed truss.

The chevron construction permits the manufacture of the webs out of a single flat sheet of metal, such as steel, by stamping or slitting successive nested webs, thereby minimizing scrap losses in the manufacturing process. Thus, the completed web construction is relatively inexpensive, easy to handle and easily positionable in place upon aligned chords for assembly thereto.

The invention herein also is concerned with the relationship of the chords and the web. Specifically, the web plate is offset inwardly from the end of the chord. The web plate is positioned to overlap a beam, stud or columnar support to reduce shear stress in the chords.

These and other objects and other advantages of this invention will become apparent upon reading the following description, of which the attached drawings form a part.

DESCRIPTION OF DRAWINGS

FIG. 1 is a perspective view of a section of the truss which forms a floor or roof deck joist.

FIG. 2 is an enlarged, fragmentary, cross-sectional view of one chord and the attached webs.

FIG. 3 is an enlarged elevational view of a single web-connector and

FIG. 4 is a side elevational view of the web-connector.

FIG. 5 is a cross-sectional view taken in the direction of arrows 5—5 of one web, and FIG. 6 is a cross-sectional view taken in the direction of arrows 6—6 of FIG. 3 of the apex connector portion of the web-connector.

FIG. 7 illustrates the nesting relationship of the webs as they are formed into blanks from a sheet of metal.

DETAILED DESCRIPTION

Figure 8:
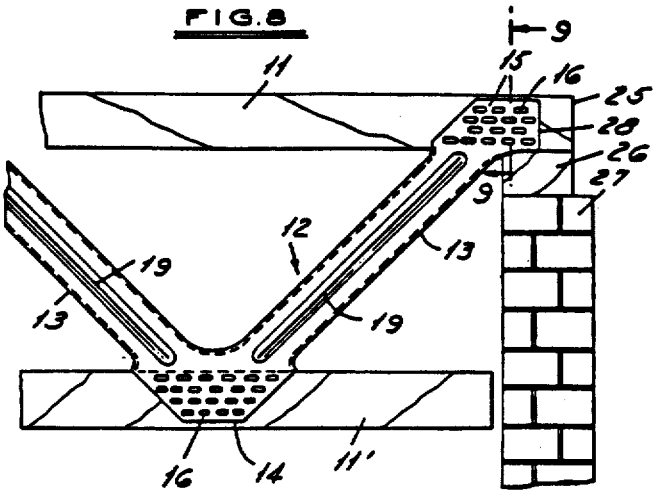
FIG. 8 is a partial front elevation of a joist with the upper chord and web plate bearing on a columnar support.

FIG. 1 illustrates a section of a truss type joist formed of a pair of vertically spaced apart wood chord members 11 which may be of conventional 2×4 lumber. The chords are interconnected by diagonally arranged struts or webs formed of sheet metal. Such metal webs 12 are made in a chevron or V-shape to provide web legs 13, an apex connector plate portion 14 and enlarged leg connector portions 15. The connector portions are provided with struckout spikes or teeth 16 for embedding into the chord members.

The edges of the web legs are bent to form a continuous inner flange 17 which extends substantially the full length of each leg and continues around the arc forming the apex between the legs, and an outer flange 18.

A channel or groove 19 is formed along the length of each leg by bending or impressing for rigidifying the legs in conjunction with the flanges.

As shown in FIG. 7, the web-connectors may be formed by starting with an elongated sheet of metal, such as suitable sheet steel of adequate strength and then blanks **12*a*** may be stamped or slit from the sheet. These blanks are in effect, nested, one within the other. To form the complete web-connectors, the blanks are first, partially lanced; second, formed or flanged; third, teeth punched; and last, finally cut off the sheet, while the sheet passes through a progressive die. Thus, as can be seen, in the manufacturing process for forming the web-connectors, there is a minimum of waste material, which obviously reduces the overall cost of manufacture.

The size, i.e., the height of the web-connectors may be varied in the manufacturing process by using stamping dies which have fixed inserts for the connector portions and teeth and removable leg-forming portions which can be interchanged with other leg-forming portions to make the legs longer or shorter, as desired.

Thus, the die expense, due to the configuration of the web-connector, is substantially reduced.

As best illustrated in FIGS. 2, 4 and 5 the central rib 19 is raised above the plane of the legs in a first direction. The inner and outer flanges 17, 18 and the teeth 16 all extend below the plane of the legs in the opposite direction.

As seen in FIGS. 3 and 7 the inner edge or inner flange 17 of each leg extends in a substantially straight line to form the interior edge of the enlarged end portion. This interior edge of the enlarged end is commonly referred to as the heel. Each enlarged end portion extends outwardly from its corresponding heel to its outer edge in a direction transverse of the central axis of the respective leg. This minimizes the waste in the aforementioned manufacture of successive nested webs as illustrated in FIG. 7.

The locator holes 65, as set forth in the aforementioned copending application, receive locator pins during assembly of the joists so that the webs are properly aligned relative to the chords.

As can be seen in FIGS. 1 and 2, the web-connectors are applied in pairs, one on each vertical face of the aligned chords, and their teeth are embedded only into the side faces of the chords. This permits forming the truss by laying one web-connector down upon a horizontal surface, with its teeth upwardly, laying the chords above it and then placing the second or opposing web-connector upon the exposed upper surfaces of the chords, teeth down, so that a single compression or clamping operation at each overlapped connector portion can cause the teeth thereof to move into the wood from opposite sides. Thus, the assembly of the web-connectors to the wood chords is simplified to a considerable extent and permits the use of the apparatus therein.

With the specific design of the web-connector, edge flanges, apex arrangement, etc., the loads applied upon the joist which is formed by this truss, places one leg of each web-connector in compression and the other leg in tension, with the resulting force component, longitudinal of each chord. The net result is balancing or approximate cancellation of vertical force components, and absorption of longitudinal force components, as well as resistance against torque or twisting forces. Hence, a good, strong joist is provided using minimal materials.

Figure 9:
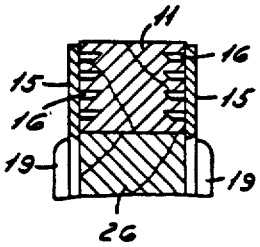
FIG. 9 is a partial cross-section as seen in the plane of arrows 9—9 of FIG. 8.

Referring now to FIGS. 8–11 the utilization of the truss of the present invention will be explained. FIGS. 8 and 9 illustrate a first embodiment of a truss having upper and lower chords 11,11$^1$ interconnected by a web-connector 12. The end plate 15 is offset inwardly from the end 25 of the upper chord 11 approximately two and a half inches. The upper chord bears on a stud or beam 26, preferably of wood, which in turn bears on a columnar support 27. Support 27 is illustrated as a brick wall but may be any type of support wall, beam, or stud, etc. The end 28 of the end connector plate 15 overlaps the stud 26 by approximately one inch.

By providing this overlap of the end plate 15, the load bears directly from the web-connector plate into the stud 26 and then to the support column. This substantially reduces the shearing forces and shear stress on the upper chord 11.

Figure 10:
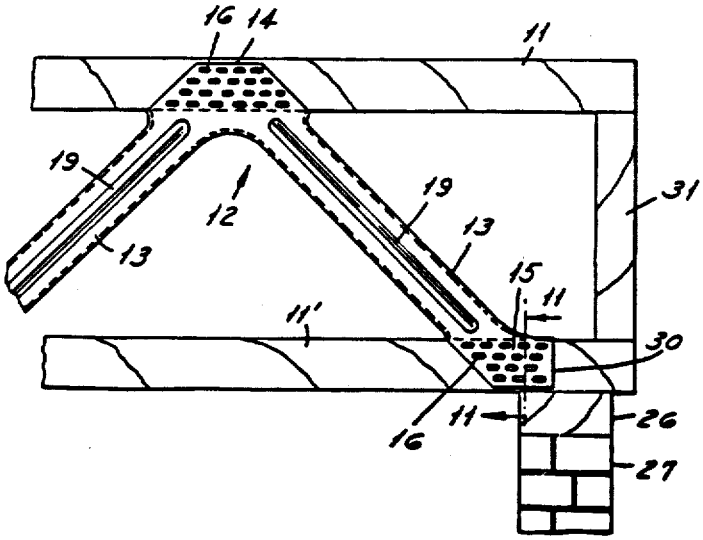
FIG. 10 is a partial front elevation of a joist with the lower chord and web plate bearing on a columnar support.
Figure 11:
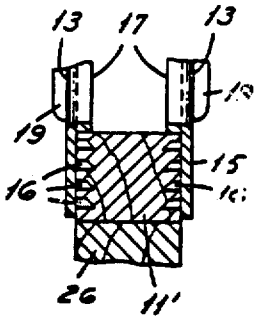
FIG. 11 is a partial cross-section as seen in the plane of arrows 11—11 of FIG. 10.

As illustrated in FIGS. 10 and 11, the inventive concept of overlapping the end plate to bear on a support column may be employed on the bottom chord. FIGS. 10 and 11 illustrate such a construction with the end 30 of the connector end plate 15 overlapping a beam or stud 26 so that the load bears on the support column 27 and shear is reduced in the lower chord 11$^1$. A cross strut 31 may be used to interconnect chords 11 and 11$^1$.

Having fully described an operative embodiment of this invention, I now claim:

1. In a sheet metal truss web-connector for interconnecting a pair of parallel, horizontally arranged, wooden elongated chord members of roughly rectangular cross-section, i.e., having coplanar opposite side faces and upper and lower faces, for thereby forming a truss-like joist, the improvement comprising:

said connector web being formed of substantially flat, rigid, sheet metal formed in a V-shape to provide a flat apex portion and two elongated diverging legs with enlarged end portions, all in substantially the same plane;

each leg of said connector web including a central integral, bent, narrow rib formed along the center of thereof and extending substantially the full length thereof, each rib being approximately V-shaped in cross-section with its apex displaced from said plane in a first direction and being substantially aligned with the central axis of its respective leg;

each enlarged end extending outwardly at its outer edge in a direction transverse of the central axis of its corresponding leg;

a plurality of pointed fastening teeth struck out and extending normal to each of said apex and end portions for embedding into coplanar sides of said chord members so that the connector web may be applied against and is located only along a side of chord members, i.e., in a generally vertical plane, and being otherwise free of securement to the inner and outer faces of the chord member;

the opposite edges of each of said legs being formed with roughly parallel, integral, continuous, narrow edge flanges extending substantially the full lengths thereof and extending in a direction opposite to said first direction, and the inner edge flange of each leg extending in a substantially straight line to form the interior edge of its respective enlarged end.

2. The invention as defined in claim 1 wherein at least one diverging leg of the connector web includes an aperture for receiving a locator pin to align the connector relative to the chords during assembly of the truss-like joist.

3. A construction as defined in claim 1, and with the inner edge defining the apex being rounded, and the leg flanges on the inner edges of said legs continuing around said rounded apex edge to form a continuous flange.

4. A construction as defined in claim 1 with said narrow edge flanges extending normally to the plane of said end portions.

5. A construction as defined in claim 1 with said narrow edge flanges extending outwardly normal to the plane of said end portions and extending from the same side of said sheet as said struck out teeth.

6. A construction as defined in claim 1 wherein one of said enlarged end portions is offset laterally inwardly from the end of one of said elongated chord members.

7. A construction as defined in claim 6 wherein the end of said one of said elongated chord members extends laterally beyond the end of the other of said elongated chord members.

8. In a sheet metal truss web-connector for interconnecting a pair of parallel, horizontally arranged, wooden elongated chord members of roughly rectangular cross-section, i.e., having coplanar opposite side faces and upper and lower faces, for thereby forming a truss-like joist, the improvement comprising:

said connector web being formed of substantially flat rigid sheet metal formed in a chevron shape to provide a flat apex portion and two elongated diverging legs with enlarged end portions at the ends of said legs opposed from said flat apex portion, said legs, said apex portion and said end portions all being substantially in the same plane;

a plurality of pointed fastening teeth struck out of and extending normal to each of said end portions and said apex portion for embedding into coplanar sides of said chord members to that the connector web may be applied against and is located only along one side of said chord members, i.e., in a generally vertical plane, and being otherwise free of securement to the inner and outer faces of the chord member; and a central integral narrow reinforcing rib formed along the center of each of said diverging legs and extending substantially the full length thereof from said apex to the respective end portion, said rib being approximately V-shaped in cross section with its apex displaced from the plane of its leg in a first direction and being substantially aligned with the central axis of its leg;

the inner edge of each leg extending in a substantially straight line to form the interior edge of its respective enlarged end;

each endlarged end extending outwardly at its outer edge in a direction transverse of the central axis of its corresponding leg.

9. In a sheet metal truss web-connector for interconnecting first and second parallel, horizontally arranged, wooden, elongated chord members of roughly rectangular cross-section, i.e., having coplanar opposite side faces and upper and lower faces, for thereby forming a truss-like joist, the improvement comprising:

said connector web being formed of substantially flat, rigid, sheet metal formed in a V-shape to provide a flat apex portion and two elongated diverging legs with enlarged end portions, all in substantially the same plane;

each leg of said connector web including a central integral, bent, narrow rib formed along the center of thereof and extending substantially the full length thereof, each rib being approximately V-shaped in cross-section with its apex displaced from said plane in a first direction and being substantially aligned with the central axis of its respective leg;

the inner edge of each leg extending in a substantially straight line to form the interior edge of its respective enlarged end;

each enlarged end extending outwardly at its outer edge in a direction transverse of the central axis of its corresponding leg;

a plurality of pointed fastening teeth struck out of and extending normal to each of said portions in a direction opposite to said first direction for embedding into coplanar sides of said chord members so that the connector web may be applied against and is located only along one side of chord members, i.e., in a generally vertical plane, and being otherwise free of securement to the inner and outer faces of the chord member;

said first chord member adapted to be positioned vertically above and bear downwardly on a support; and one of said connector web enlarged end portions embedded in said first chord member being positioned to laterally overlap said support so that shear forces in said first chord member are reduced by said one connector web enlarged end portion transmitting bearing forces downwardly onto said support.

10. The invention as defined in claim 9 wherein at least one diverging leg of the connector web includes an aperture for receiving a locator pin to align the connector relative to the chords during assembly of the truss-like joist.

11. The construction as defined in claim 9 wherein said first chord member is positioned vertically above said second chord member.

12. The construction as defined in claim 11 wherein the first chord member extends outwardly beyond the end of said second chord member.

13. The construction as defined in claim 9 wherein said first chord member is positioned vertically below said second chord member.

*14. In a sheet metal truss web-connector for interconnecting a pair of parallel, horizontally arranged, wooden elongated chord members of roughly rectangular cross-section, i.e., having opposite side faces and upper and lower faces, for thereby forming a truss-like joist, the improvement comprising:*

*said connector web being formed of substantially flat, rigid, sheet metal formed in a V-shape to provide a flat apex portion and two elongated diverging legs with enlarged end portions;*

*each enlarged end extending outwardly at its outer edge in a direction transverse of the central axis of its corresponding legs;*

*a plurality of pointed fastening teeth struck out and extending normal to each of said apex and end portions for embedding into sides of said chord members so that the connector web may be applied against and is located only along a side of chord members and being otherwise generally free of securement to the inner and outer faces of the chord member:*

*the opposite edges of each of said legs being formed with integral, continuous, narrow edge flanges extending along at least a substantial part of the lengths thereof; and*

*the inner edge flange of each leg extending in a substantially straight line to form the interior edge of its respective enlarged end.*

*15. The truss web-connector of claim 14 wherein the flat apex portion, legs and enlarged end portions are all in substantially the same plane.*

*16. The truss web-connector of claim 14 wherein the edge flanges of each leg are roughly parallel and extend substantially the full length of each leg.*

*17. The truss web-connector of claim 14 further including a central integral reinforcing groove formed along the center of each of said diverging legs.*

*18. In a sheet metal truss web-connector for interconnecting a pair of parallel, horizontally arranged, wooden elongated chord members of roughly rectangular cross-section, i.e., having opposite side faces and upper and lower faces, for thereby forming a truss-like joist, the improvement comprising:*

*said connector web being formed of substantially flat rigid sheet metal formed in a chevron shape to provide*

*a flat apex portion and two elongated diverging legs with enlarged end portions at the ends of said legs opposed from said flat apex portion;*

*a plurality of pointed fastening teeth struck out of and extending normal to each of said end portions and said apex portion for embedding into sides of said chord members so that the connector web may be applied against and is located only along one side of said chord members, and being otherwise generally free of securement to the inner and outer faces of the chord member; and*

*a central integral reinforcing groove formed along the center of each of said diverging legs and extending along at least a substantial part of the full length thereof from said apex to the respective end portion, said groove being substantially aligned with the central axis of its leg;*

*the inner edge of each leg extending in a substantially straight line to form the interior edge of its respective enlarged end;*

*each enlarged end extending outwardly at its outer edge in a direction transverse of the central axis of its corresponding leg.*

*19. In a sheet metal truss web-connector for interconnecting a pair of parallel, horizontally arranged, wooden elongated chord members of roughly rectangular cross-section, for thereby forming a truss-like joist, the improvement comprising:*

*said connector web being formed of substantially flat rigid sheet metal formed to provide at least one flat apex portion and at least one elongated diverging leg with an enlarged portion at the end of said leg opposed from said flat apex portion;*

*a plurality of pointed fastening teeth struck out of and extending normal to each end portion and apex portion for embedding into sides of said chord members so that the connector web may be applied against and is located only along one side of said chord members, and being otherwise generally free of securement to the inner and outer faces of the chord member; and*

*a central integral reinforcing groove formed along the center of each diverging leg and extending along a substantially part of the full length thereof, said groove having its apex displaced from the plane of its leg and being substantially aligned with the central axis of its leg;*

*the inner edge of each leg extending in a substantially straight line to form the interior edge of its respective enlarged end;*

*each enlarged end extending outwardly at its outer edge in a direction transverse of the central axis of its corresponding leg.*

*20. The truss web-connector of claim 19 wherein the connector has a V-shape comprising one apex portion and two legs.*

*21. The truss web-connector of claim 19 wherein each flat apex portion, each leg and each enlarged end portion are all in substantially the same plane.*

*22. The truss web-connector of claim 19 wherein the edge flanges of each leg are roughly parallel and extend substantially the full length of each leg.*

* * * * *